March 17, 1931. G. DUSMET 1,796,513
SHOCK ABSORBER AUTOMATICALLY CONTROLLABLE WITH SPEED OF VEHICLE
Filed March 13, 1929
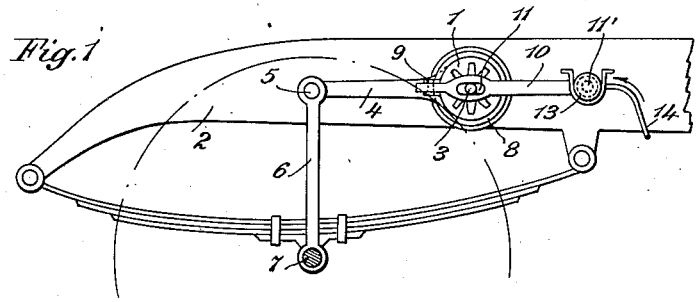
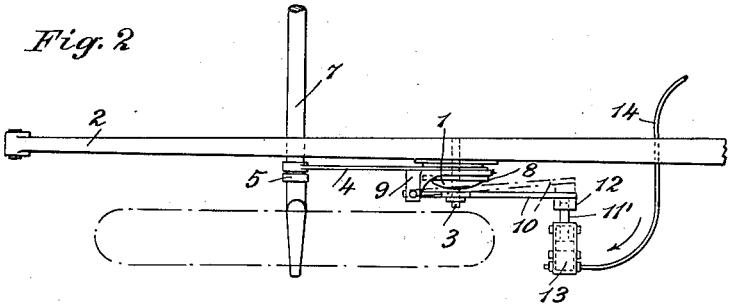
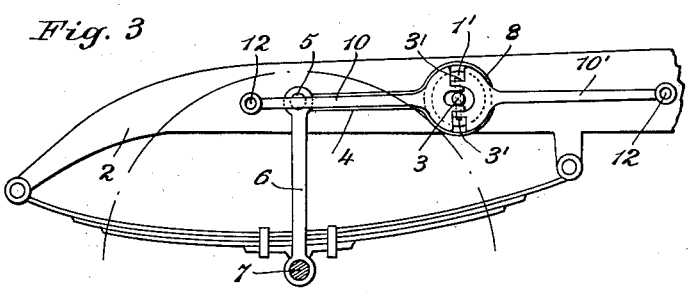
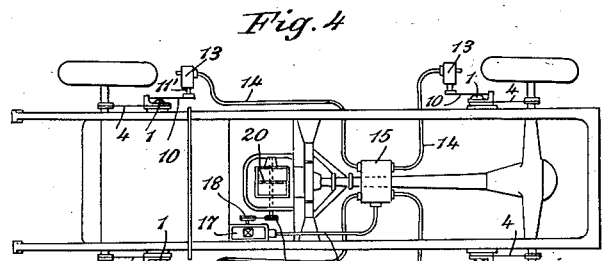
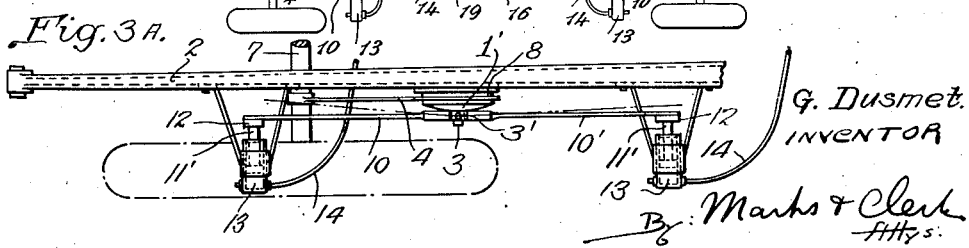
G. Dusmet.
INVENTOR
By Marks & Clerk
Attys.

Patented Mar. 17, 1931

1,796,513

UNITED STATES PATENT OFFICE

GIACOMO DUSMET, OF ROME, ITALY

SHOCK ABSORBER AUTOMATICALLY CONTROLLABLE WITH SPEED OF VEHICLE

Application filed March 13, 1929, Serial No. 346,718, and in Italy November 27, 1928.

My present invention has for its object to control frictional shock absorbers, f. i. of the Hartford type, automatically with speed of vehicle when running, by providing means, hereinafter described, connected to the speed change gear and automatically acting on arms connected to the friction disks of shock absorber so as to impart to them a pressure varying according to speed of machine.

Forms of said invention will be described by merely illustrative, but not limitative examples, with reference to the annexed drawings in which Figs. 1 and 2 show respectively an elevation and plan view of shock absorber applied to a vehicle wheel, Fig. 3 is an elevation view of a modification, Fig. 3ᵃ is a fragmentary top plan view of Fig. 3, and Fig. 4 a plan view showing the underframe of a motor car with the shock absorbers and their operating members applied thereto.

My improved shock absorber comprises a known friction disk system 1 fixed to longitudinal frame 2 of the vehicle by pivot 3 (Figs. 1 and 2). Solid with the movable disk is arm 4 journalled at 5 to arm 6 which with its other end is united to axle 7. On the circumference of the disks a ring 8 is interposed provided with a bearing to which an arm 10 is pivoted which has an eyelet 11 engaged by pivot 3, the said arm acting by pressure on the disks by means of a piston 11′ operated by fluid pressure. Said piston is guided and kept in place by arm 10 of a bushing or equivalent member 12 fixed to the end of said arm. The piston cylinders 13 are suitably fixed to the longitudinal frame of the machine.

In Figs. 3 and 3ᵃ pressure is imparted to disks 1 by two arms 10 and 10′ rotatably mounted on an orthogonal pivot 3′ passing through the end of pivot 3 of the disks, and adjacent to their ends the said arms expand and bear on pressure disk 1′. On their free outer ends the said arms carry bushings 12 adapted to receive the heads of pistons 11′.

The cylinders 13 are connected to a tubing 14 from a reservoir 15 connected by tube 16 to a force pump 17 operated by gearing 18 engaging with gearing 19 suitably connected to the change speed gear 20 so that during operation of said gearings the air is correspondingly and proportionally distributed to the cylinders and consequently to their pistons, and thence to the pressure arms of the disks.

The atmospheric pressure in the réservoir and cylinders acting on the lever arms of the shock absorbers therefore appears to be greater or smaller according to the piston strokes of central pressure pump and therefore proportional to speed of vehicle. The running will consequently be facilitated by the correct and constant braking of the (semi-elliptical) springs of vehicle.

Obviously the parts of invention and their arrangement may be modified in various ways when useful or necessary without departing from scope of invention.

It is further understood that my above described shock absorber may be fitted to any vehicle type, also with independent wheels and coil springs, and may be mounted for instance on railway car bogies, road trailers and aircraft carriages.

Having now particularly described and ascertained the nature of my said invention and in what manner the same is to be performed, I declare that what I claim is:

In a shock absorber for vehicles provided with a friction disk pivotally mounted on the vehicle frame and having positive connection with the wheel axle; the combination with a pair of pressure arms having a common hinge member mounted on the disk pivot, pistons on the extreme ends of said arms, compression fluid cylinders for said pistons secured on said frame, and suitable conduits with a pressure fluid source for said cylinders, whereupon when the pistons are actuated by said pressure the arms communicate frictional pressure against said disk.

In testimony whereof I have hereunto set my hand.

GIACOMO DUSMET.